US008720637B2

(12) United States Patent
Wieres et al.

(10) Patent No.: US 8,720,637 B2
(45) Date of Patent: May 13, 2014

(54) HONEYCOMB BODY FOR AN EXHAUST GAS PURIFICATION SYSTEM, METHOD FOR PRODUCING A HONEYCOMB BODY, EXHAUST LINE SECTION AND MOTOR VEHICLE

(75) Inventors: Ludwig Wieres, Overath (DE); Rolf Brück, Bergisch Gladbach (DE); Hubertus Kotthoff, Ruppichteroth (DE)

(73) Assignee: EMITEC Gesellschaft fuer Emissiontechnologie mbH, Lohmar (DE)

( * ) Notice: Subject to any disclaimer, the term of this patent is extended or adjusted under 35 U.S.C. 154(b) by 0 days.

(21) Appl. No.: 13/245,998

(22) Filed: Sep. 27, 2011

(65) Prior Publication Data

US 2012/0043153 A1 Feb. 23, 2012

Related U.S. Application Data

(63) Continuation of application No. PCT/EP2010/052465, filed on Feb. 26, 2010.

(30) Foreign Application Priority Data

Mar. 27, 2009 (DE) .......................... 10 2009 015 420

(51) Int. Cl.
*B60K 13/04* (2006.01)
(52) U.S. Cl.
USPC ......................................... 180/309; 428/116
(58) Field of Classification Search
USPC ......................................... 180/309; 428/116
See application file for complete search history.

(56) References Cited

U.S. PATENT DOCUMENTS

| 5,518,678 A * | 5/1996 | Miyamoto et al. ....... 264/177.12 |
| 6,713,025 B1 | 3/2004 | Ivanescu et al. |
| 7,703,277 B2 | 4/2010 | Ueda et al. |
| 7,849,676 B2 | 12/2010 | Witte-Merl |
| 8,110,274 B2 * | 2/2012 | Ohno et al. ................... 428/116 |

(Continued)

FOREIGN PATENT DOCUMENTS

| AT | 6726 U1 | 3/2004 |
| DE | 9313593 U1 | 11/1993 |

(Continued)

OTHER PUBLICATIONS

International Search Report of PCT/EP2010/052465, Dated Apr. 28, 2010.

*Primary Examiner* — Jeffrey J Restifo
(74) *Attorney, Agent, or Firm* — Laurence A. Greenberg; Werner H. Stemer; Ralph E. Locher

(57) ABSTRACT

A honeycomb body for an exhaust-gas purification system may be used, for example, as a carrier body for catalytically acting coatings or as a filter, absorber or mixer in the exhaust system of an internal combustion engine. The honeycomb body has channels, an axial main direction, a planar front surface, a planar end surface and a circumferential surface disposed parallel to the axial main direction. The front surface and/or the end surface are disposed obliquely with respect to the axial main direction. Such a honeycomb body is advantageous, in particular, for applying reducing agent to the oblique end or front surface. A method for producing a honeycomb body, an exhaust line section and a motor vehicle are also provided.

12 Claims, 3 Drawing Sheets

(56) References Cited

U.S. PATENT DOCUMENTS

| | | | |
|---|---|---|---|
| 2006/0144632 A1* | 7/2006 | Ranalli et al. | 180/309 |
| 2006/0292336 A1* | 12/2006 | Ohno et al. | 428/116 |
| 2006/0292339 A1* | 12/2006 | Ohno et al. | 428/116 |
| 2006/0292341 A1* | 12/2006 | Ohno et al. | 428/116 |
| 2006/0292342 A1* | 12/2006 | Ohno et al. | 428/116 |
| 2007/0004592 A1* | 1/2007 | Ohno et al. | 502/439 |
| 2007/0004593 A1* | 1/2007 | Ohno et al. | 502/439 |
| 2007/0036694 A1 | 2/2007 | Nishioka et al. | |
| 2008/0041036 A1 | 2/2008 | Witte-Merl | |
| 2008/0087489 A1* | 4/2008 | Bruck et al. | 180/309 |
| 2008/0118701 A1* | 5/2008 | Ohno et al. | 428/116 |
| 2008/0119355 A1* | 5/2008 | Ohno et al. | 502/340 |
| 2008/0176028 A1* | 7/2008 | Ohno et al. | 428/116 |
| 2008/0187713 A1* | 8/2008 | Ohno et al. | 428/116 |
| 2008/0241003 A1* | 10/2008 | Ido et al. | 422/168 |
| 2008/0241005 A1* | 10/2008 | Ido et al. | 422/177 |
| 2008/0241008 A1* | 10/2008 | Ido et al. | 422/180 |
| 2008/0260991 A1* | 10/2008 | Konstandopoulos et al. | 428/116 |
| 2009/0011176 A1* | 1/2009 | Ichikawa | 428/116 |
| 2010/0009117 A1* | 1/2010 | Okazaki | 428/116 |
| 2010/0044300 A1* | 2/2010 | Yamaguchi | 210/446 |
| 2010/0248951 A1* | 9/2010 | Ohno et al. | 502/242 |
| 2011/0100744 A1* | 5/2011 | Bruck | 180/309 |
| 2011/0232986 A1* | 9/2011 | Nording et al. | 180/309 |
| 2012/0043153 A1* | 2/2012 | Wieres et al. | 180/309 |
| 2012/0251402 A1* | 10/2012 | Goto et al. | 422/180 |

FOREIGN PATENT DOCUMENTS

| | | |
|---|---|---|
| DE | 19947803 A1 | 4/2001 |
| DE | 10224436 A1 | 12/2003 |
| DE | 102006038904 A1 | 2/2008 |
| JP | S62165422 U | 10/1987 |
| JP | S6393332 A | 4/1988 |
| JP | 2005188395 A | 7/2005 |
| JP | 2006214388 A | 8/2006 |
| JP | 2008045559 A | 2/2008 |
| WO | 0070206 A1 | 11/2000 |
| WO | 02/46093 A2 | 6/2002 |
| WO | 2008/096852 A1 | 8/2008 |

* cited by examiner

HONEYCOMB BODY FOR AN EXHAUST GAS PURIFICATION SYSTEM, METHOD FOR PRODUCING A HONEYCOMB BODY, EXHAUST LINE SECTION AND MOTOR VEHICLE

CROSS-REFERENCE TO RELATED APPLICATION

This is a continuation, under 35 U.S.C. §120, of copending International Application No. PCT/EP2010/052465, filed Feb. 26, 2010, which designated the United States; this application also claims the priority, under 35 U.S.C. §119, of German Patent Application DE 10 2009 015 420.5, filed Mar. 27, 2009; the prior applications are herewith incorporated by reference in their entirety.

BACKGROUND OF THE INVENTION

Field of the Invention

The invention relates to a honeycomb body for an exhaust-gas purification system and to a method for the production thereof and integration thereof into an exhaust-gas purification system. The invention also relates to an exhaust line section and a motor vehicle.

Honeycomb bodies of that type may be used, for example, as carrier bodies for catalytically acting coatings and/or as filters, adsorbers or mixers in the exhaust system of an internal combustion engine. Metallic honeycomb bodies (of layered construction) and ceramic honeycomb bodies (of extruded construction) are known for that purpose. Honeycomb bodies used for exhaust-gas purification are generally distinguished by having an inflow side which is impinged upon by the exhaust gases discharged by an internal combustion engine. Channels of the honeycomb body adjoining the inflow side extend to an outflow side at which the exhaust gases exit the honeycomb body again. The channels of the honeycomb body generally have walls with which the exhaust gas comes into contact as it flows through. The entry of the exhaust-gas flow into the honeycomb body has a significant influence on the distribution of the exhaust gas into the individual channels of the honeycomb body. A certain distribution of the exhaust gas into the individual channels is set according to the way in which the inflow side of the honeycomb body is constructed. Different constructions of the inflow side of honeycomb bodies have already been proposed in the prior art, for example telescoped or jagged inflow sides in which the individual walls between the channels protrude to different extents.

The configuration of the inflow side of a honeycomb body also has an influence on the flow resistance of the honeycomb body, because a pressure cushion generally forms upstream of the honeycomb body and the pressure cushion can be influenced by the configuration of the inflow surface. It is not only the inflow side of the honeycomb body which influences the flow resistance of the honeycomb body. The flow resistance of the honeycomb body and the distribution of the exhaust-gas flow downstream of the honeycomb body can also be influenced by a suitable configuration at the outflow side at the end of the channels.

Since it is often sought for the honeycomb bodies to be mounted in the exhaust line in a manner adapted to the flow behavior of the exhaust gas or of other additives, there is also the problem of how that can be realized with high accuracy and low technical expenditure within the context of series production.

SUMMARY OF THE INVENTION

It is accordingly an object of the invention to provide a honeycomb body for an exhaust gas purification system, a method for producing a honeycomb body, an exhaust line section and a motor vehicle, which overcome the hereinafore-mentioned disadvantages and highlighted technical problems of the heretofore-known devices and methods of this general type. It is sought, in particular, to specify a honeycomb body which is distinguished by an inflow side and an outflow side which have a particularly advantageous structure for the exhaust-gas flow. It is also sought to specify a method for producing a honeycomb body of that type.

With the foregoing and other objects in view there is provided, in accordance with the invention, a honeycomb body, comprising an axial main direction, channels, a planar front surface, a planar end surface, and a circumferential surface disposed parallel to the axial main direction. At least one of the front surface or the end surface is/are disposed obliquely relative to the axial main direction.

This honeycomb body is preferably formed with a multiplicity of channels which may, if appropriate, run substantially parallel to one another and/or substantially parallel to the axial main direction. The front surface or end surface is considered to be "planar," in particular, if it lies practically entirely in a plane and, in particular, substantially all the channels and the walls delimiting the channels end entirely (within common production tolerances) in a common planar front surface or end surface. In this case, "obliquely" means, in particular, that the front surface and/or the end surface are disposed at an angle to a cross-sectional area, disposed normal to the axial main direction, of the honeycomb body. The angle may, for example, be between 30° and 60°, preferably approximately 45°. If a honeycomb body of this type is disposed in an exhaust system and an exhaust-gas flow impinges on such an obliquely positioned end or front surface of the honeycomb body, a part of the exhaust gases passes into the channels of the honeycomb body earlier because some channels start further forward in the flow direction of the exhaust gas due to the slope of the end or front surface. It has been found that a honeycomb body surface impinged upon in this way may be advantageous for the flow in an exhaust system.

Honeycomb bodies of this type may be constructed, for example, as catalyst carrier bodies, filters, adsorbers or mixers and inserted into an exhaust system.

In accordance with another, particularly advantageous feature of the invention, the honeycomb body has at least one at least partially corrugated metal layer which forms the channel walls that delimit the channels. Consideration is given, in particular, to (entirely or partially) corrugated and/or smooth metal foils for use as the metal layer. Furthermore, the use of metallic nonwovens (woven fabric, knitted fabric, tangle of superfine wires) or metal fiber mats is alternatively or additionally also possible. Honeycomb bodies composed of metal layers are distinguished by channel walls which are thin in relation to the channel cross section. Such thin walls generate a lower flow resistance. Furthermore, metallic honeycomb bodies are highly durable. Typically, in order to produce such metallic honeycomb bodies, a plurality of smooth and corrugated metal layers are disposed one on top of the other as a stack. In particular, the smooth metal layer may be a metallic nonwoven in this case. The metal layers disposed one above the other as a stack are then coiled, wound or stacked to form a honeycomb structure. Brazed or welded connections are formed at desired locations at the contact points between the metal layers. In this case, it is possible for not all such contact points to be formed with brazed or welded connections.

In accordance with a further advantageous feature of the invention, the honeycomb body is formed with at least two honeycomb body segments each of which have at least one planar face that is normal to the axial main direction, and the normal faces of the at least two honeycomb body segments are disposed facing one another. The honeycomb body segments preferably also form the (common) circumferential surface of the honeycomb body. It is therefore advantageous for the circumferential surfaces of the two honeycomb body segments to be disposed flush with one another, and to jointly form the circumferential surface of the entire honeycomb body. In this case, the planar front surface and the planar end surface of the honeycomb body are formed with different honeycomb body segments, in such a way that, for example, a first honeycomb body segment forms, with one face, the planar and oblique front surface, and a second honeycomb body segment forms, with one face, the planar and oblique end surface. The respective faces normal (perpendicular) to the axial main direction are then disposed between the planar front surface and the planar end surface of the honeycomb body (for example with a (small) gap between one another or directly adjacent one another).

The two honeycomb body segments from which the honeycomb body according to the invention is constructed may perform different tasks in an exhaust system. It is, for example, possible for honeycomb body segments with different types of metal layers, such as for example metal foils and/or metallic nonwovens, to be disposed adjacent one another (in contact) at their faces. The individual honeycomb body segments may be connected to one another by a connection. In this case, a welded or brazed connection is possible, in particular. Honeycomb bodies according to the invention typically have a housing which extends along the circumferential surface of the honeycomb body. The housing often has a thickness significantly greater than the thickness of the metal layers which form the honeycomb structure of the honeycomb body. The individual honeycomb body segments also conventionally have a corresponding housing part. Specifically, these housing parts are particularly suitable, due to their thickness, for forming a cohesive connection of the honeycomb body segments to one another. The construction of a honeycomb body according to the invention from at least two honeycomb body segments is advantageous because, in this way, the production of honeycomb bodies with oblique front surfaces and/or end surfaces using conventional production processes (coiling, stacking and/or winding metal layer stacks) is made very simple, in such a way that all of the metal layers end in a planar, oblique front or end surface.

In accordance with an added feature of the invention, a honeycomb body of this type also conforms to the invention if the at least two honeycomb body segments each have channels and channel walls, and the channels of the at least two honeycomb body segments are disposed flush with one another along the axial main direction. In this case, a "flush" configuration of the channels of the two honeycomb body segments along the axial main direction means, in particular, that the channels extend typically from a honeycomb body segment disposed as the first (in the flow direction of the exhaust gas) in the honeycomb body into the honeycomb body segment disposed downstream (in the flow direction of the exhaust gas) without (significant) interruption. In this case, "flush" also means that the channels are disposed in alignment, opposite and/or so as to merge into one another.

Such a flush configuration is advantageous because, in this way, internal turbulence zones for the exhaust gas in the honeycomb body itself are avoided. In particular, it is advantageous if, within conventional production tolerances, all of the channels and, in particular, also the channel walls, which are formed preferably from metal layers and which delimit the individual channels with respect to one another, are disposed flush with one another along the axial main direction in both honeycomb body segments. Such a configuration requires a high degree of precision in the manufacture of the two honeycomb body segments, in particular if they are metallic honeycomb bodies which are coiled, wound or stacked. Exact correspondence of the channel configurations in the cross section of the two honeycomb body segments is necessary for such a configuration, and the correspondence can be attained with an accordingly high degree of precision during the production of the honeycomb body segments.

Alternatively, or if more than two honeycomb body segments are used, it is also possible for an offset to be provided, intentionally, between the channels of the two honeycomb body segments. Such an offset may generate turbulence and/or a deflection zone for exhaust gases at the transition from the honeycomb body segment disposed first in the flow direction into the honeycomb body segment disposed downstream thereof in the flow direction of the exhaust gas. It may be advantageous for such an offset to be provided in this case, in particular, if the honeycomb body segments in the exhaust system have different functions (catalyst carrier body, filter, adsorber and/or mixer).

Furthermore, it is also possible for the individual honeycomb body segments to be joined together at faces which are not normal to the axial main direction, in particular oblique faces, in order to form a honeycomb body according to the invention.

In accordance with an additional, advantageous feature of the invention, the honeycomb body also has, parallel to the axial main direction, a longest axial extent and a shortest axial extent, wherein the longest axial extent is significantly longer than the shortest axial extent. The difference between the axial extents of the honeycomb body arises, in particular, due to the construction with only one (1) oblique front surface or with only one (1) oblique end surface. In this case, it is also particularly advantageous for the longest axial extent of the honeycomb body to be at least 5 times, and in particular at least 10 times, as long as the shortest axial extent. Such a construction of the honeycomb body has the effect that some of the channels of the honeycomb body, in particular the channels in the region of the shortest axial extent, have a considerably lower flow resistance for the exhaust-gas flow than other channels. The channels in the region of the longest extent of the honeycomb body generally have the highest flow resistance. The flow distribution of the exhaust gas in the honeycomb body and also in the exhaust line disposed upstream and downstream of the honeycomb body is influenced through the use of such a distribution of the channel lengths. A honeycomb body of this type can therefore be used to generate specific flow profiles which are, in particular, suitable for obtaining thorough mixing of the exhaust gas. In particular, if the honeycomb body has an oblique front surface and an oblique end surface, it may be formed through the use of at least two honeycomb body segments constructed as described herein, wherein channels of equal length are again formed all the way across as a result of the combination.

In accordance with yet another feature of the invention, a honeycomb body also conforms to the invention if the planar front surface and the planar end surface are disposed substantially parallel to one another. A honeycomb body of this type has approximately identical channel lengths over the entire cross section, as a result of which the flow resistance of the honeycomb body is approximately equal over the entire cross section and therefore a uniform distribution of the exhaust gas is generated in the honeycomb body, and an oblique front surface and end surface is nevertheless simultaneously provided. A honeycomb body of this type has, for example, substantially the shape of a parallelogram when viewed from the side (or in cross section).

With the objects of the invention in view, there is also provided a method for producing a honeycomb body. The method comprises:
a) providing an initial honeycomb body having an axial main direction and two faces normal to the axial main direction;
b) dividing, partitioning or separating the initial honeycomb body along an oblique line to form two honeycomb body segments;
c) configuring the two faces to face one another; and
d) connecting the two honeycomb body segments to one another.

The method is suitable, in particular, for producing the honeycomb body according to the invention described herein.

During step a), use may be made of an already finished initial honeycomb body which has, for example, been produced reliably and with high precision using known production methods. In this case, use is made, in particular, of initial honeycomb bodies which have already been joined to a housing, that is to say, for example, initial honeycomb bodies which, with metallic layers, form a honeycomb structure with a multiplicity of parallel channels which have been inserted and brazed into a housing. Then, in step b), at least one initial honeycomb body is divided or partitioned in such a way that a multiplicity of honeycomb body segments is formed, wherein preferably each part formed in this case is a honeycomb body segment, that is to say, in particular, no waste is produced (the sum of the volumes of the honeycomb body segments thus substantially corresponds to the volume of the initial honeycomb body). In this case, during the partitioning, separating or dividing process, it is preferable for the housing and/or all of the channels to be split. This may take place through the use of corresponding (for example mechanical and/or thermal) cutting processes which are selected, for example, while also taking into consideration the material of the initial honeycomb body. In step c), the honeycomb body segments thus produced are then redisposed in terms of their sequence in relation to that in which they were formed in step b), in such a way that the normal faces which delimit the initial honeycomb body and which were originally pointing away from one another are now disposed facing one another (in a "face to face" configuration). For this purpose, the two honeycomb body segments which have the normal faces are, for example, rotated in each case through 180°, in such a way that the axial main directions of the two honeycomb body segments then run in opposite directions. In order to produce the honeycomb body, the honeycomb body segments are then directly or indirectly joined to one another (for example welded at the housing parts) in such a way that a stable assembly is formed again.

It has already been stated that, due to the classic production process (stacking, winding and/or coiling) of honeycomb bodies composed of metal layers, the production of honeycomb bodies with planar faces is problematic. For this reason, it is advantageous for the planar front surfaces or end surfaces of such honeycomb bodies to be produced from an initial honeycomb body, for example, through the use of an oblique cut. If the initial honeycomb body is, for example, a classic cylindrical honeycomb body with faces normal (perpendicular) to the axial main direction, it is thus possible for two honeycomb body segments to be produced in a simple manner. It is, however, also possible for a plurality of honeycomb body segments to be produced through the use of alternating normal and oblique cuts. The production of a honeycomb body according to the invention from two honeycomb body segments which have been produced from a common initial honeycomb body through the use of a cut (separating process, such as for example sawing, laser cutting, etc.) is therefore particularly advantageous because, with honeycomb body segments produced in this way, it is ensured that the channels of the two honeycomb body segments can be disposed approximately flush with one another, without it being necessary to give particular regard to the correspondence of the channel configuration during the stacking, winding and/or coiling of the metal layer stack.

With the objects of the invention in view, there is furthermore provided an exhaust line section, comprising a honeycomb body according to the invention or produced by the method according to the invention with oblique front and end surfaces, and at least one exhaust line section branch having a direction of extent. The at least one exhaust line section branch faces one of the oblique front surface or oblique end surface and is directed toward the one oblique front surface or oblique end surface.

It is preferable in this case for the direction of extent to be aligned (approximately) perpendicular to the respective oblique front surface or end surface, and in particular to intersect the respective oblique front surface or end surface centrally (for example in the region of the axial main direction or central axis). In this case, "perpendicular" is to be understood to mean angles of 70° to 90°, and in particular of 80° to 90°, between the direction of extent and the front surface or end surface.

Such an exhaust line section may be easily integrated into an exhaust system. The branch in the exhaust line is suitable, in particular, for placing a probe in the exhaust line section for monitoring the exhaust gas and/or a supply for a reducing agent, for example. Due to the alignment of the direction of extent of the branch in relation to the oblique front surface and/or end surface of the honeycomb body, the supplied reducing agent can be applied to the honeycomb body directly and in a uniformly distributed manner. The oblique configuration permits the direct application of reducing agent to a front or end surface of a honeycomb body, for example even without a separate deflection.

With regard to production, it should be noted that a further step e) may also accordingly be added if appropriate, in which the honeycomb body is connected, at least at or close to an oblique front surface or end surface, to an exhaust line section by technical joining (for example through the use of a welded connection). If the oblique front surface and the oblique end surface of the honeycomb body are connected in each case to an exhaust line section, it is preferable for the exhaust line sections to be formed from one initial exhaust pipe which (similarly to step b) for the initial honeycomb body) is partitioned or divided through the use of an oblique cut. The two oblique interfaces (which are coordinated with one another) of the honeycomb body segments and of the exhaust line sections match one another and can be precisely joined to one another.

With the objects of the invention in view, there is concomitantly provided a motor vehicle, comprising an internal combustion engine and an exhaust system which has an exhaust line with a main flow direction (through the exhaust line away from the internal combustion engine) and at least one honeycomb body according to the invention or a honeycomb body produced by the method according to the invention or at least one exhaust line section according to the invention. The exhaust system has a supply for reducing agent, which supply is disposed downstream of the honeycomb body in the main flow direction, in such a way that reducing agent supplied impinges in a backward direction, that is to say preferably at least partially oppositely to the main flow direction, on an oblique front surface or end surface of the honeycomb body.

The injection of reducing agent onto an outflow side disposed in this way, of a honeycomb body, is particularly advantageous also because the reducing agent thus initially adheres to the rear channel walls of the honeycomb body, and there is therefore a resulting residence time during which the reducing agent can be thermolytically converted. It is also possible for the channel walls of the honeycomb body to be provided with a hydrolytically acting coating in the region of the surface against which the reducing agent impinges, in such a way that the reducing agent is also hydrolytically converted. In any case, it can thus be ensured in a simple manner that the reducing agent (for example a urea-water solution) does not settle on the cold exhaust line and form deposits there.

Other features which are considered as characteristic for the invention are set forth in the appended claims, noting that the features and steps specified individually in the claims may be combined with one another in any desired technologically meaningful way and may be supplemented by explanatory facts, in particular in conjunction with the figures, with further structural variants of the invention being highlighted.

Although the invention is illustrated and described herein as embodied in a honeycomb body for an exhaust gas purification system, a method for producing a honeycomb body, an exhaust line section and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
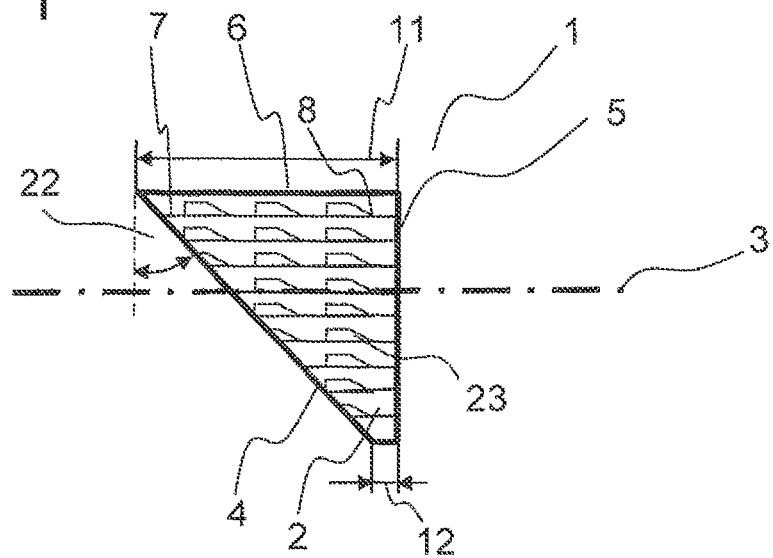
FIG. 1 is a diagrammatic, longitudinal-sectional view of a honeycomb body according to the invention.
Figure 2:
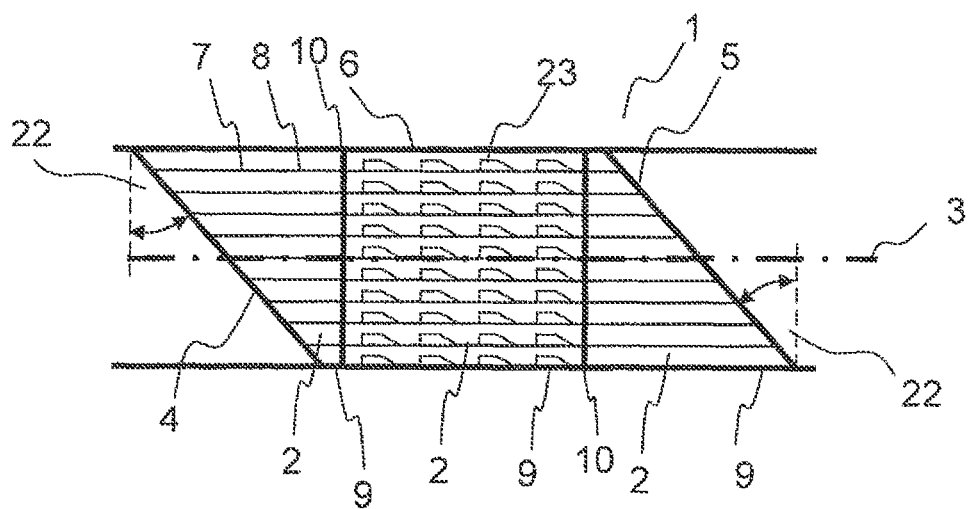
FIG. 2 is a longitudinal-sectional view of an assembled honeycomb body according to the invention.
Figure 3:
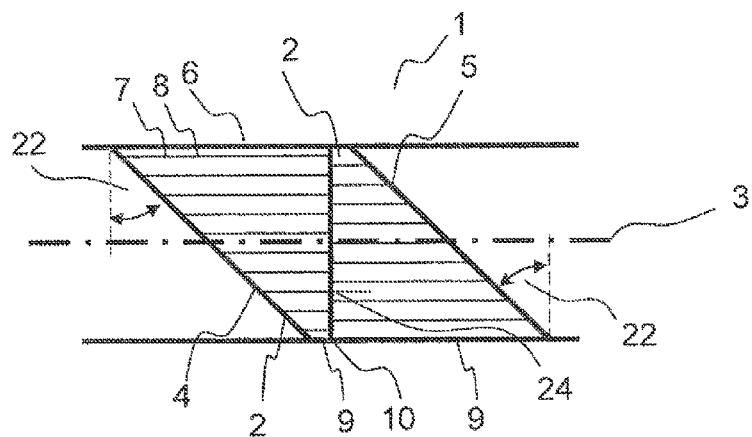
FIG. 3 is a longitudinal-sectional view of an assembled honeycomb body according to the invention.

Referring now in detail to the figures of the drawing for explaining the invention and the technical field in more detail by showing particularly preferred structural variants to which the invention is not restricted, and first, particularly, to FIGS. 1, 2 and 3 thereof, there are seen honeycomb bodies 1 according to the invention. The honeycomb bodies 1 have in each case a front surface 4 and an end surface 5. They also have in each case a circumferential surface 6 and an axial main direction 3 which is parallel to the circumferential surface 6. The circumferential surface 6 is preferably cylindrical. Circumferential surfaces 6 in the form of a rectangle or a rectangle with rounded corners or circumferential surfaces 6 which are oval and/or triangular with rounded corners are, however, also possible. Each honeycomb body 1 also has a multiplicity of channels 2 and channel walls 8. In this case, the honeycomb bodies 1 are formed, for example, from metal layers 7.

In the honeycomb body 1 illustrated in FIG. 1, only the front surface 4 is disposed at an angle 22 obliquely with respect to the axial main direction 3 (also referred to herein as the central axis). In the honeycomb bodies 1 in FIGS. 2 and 3, in each case the front surfaces 4 and the end surfaces 5 are disposed at an angle 22 obliquely with respect to the axial main direction 3 (also referred to herein as the central axis). The angle 22 need not imperatively be the same for the front surface 4 and for the end surface 5.

It can also be seen in FIG. 1 that the honeycomb body 1 according to the invention has a longest axial extent 11 and a shortest axial extent 12 along the axial main direction 3. As an additional special feature, the metal layers 7 of the honeycomb body 1 are provided, in FIG. 1, with deflecting structures 23 which deflect exhaust gas within the honeycomb body 1 from one channel 2 into an adjacently disposed channel 2. Openings are typically also provided in the metal layers 7 in the vicinity of the deflecting structures 23 in the metal layers 7, which openings are, however, not illustrated in FIG. 1. The deflecting structures 23 in the honeycomb bodies 1 according to the invention may, for example, also be disposed in such a way that exhaust gases are deflected from the region of particularly short axial channel lengths in the vicinity of the shortest axial extent 12 in the direction of regions of greater axial channel lengths in the vicinity of the longest axial extent 11. As is also evident in conjunction with the subsequent figures, the honeycomb body 1 may also be formed in the manner of a honeycomb body segment 9, in such a way that in this case, reference is likewise made to the description.

The honeycomb bodies 1 according to the invention shown in FIGS. 2 and 3 are formed in each case from a plurality of honeycomb body segments 9 which are disposed with faces 10 that are normal (perpendicular) to the axial main direction 3 facing one another. In FIG. 2, one of the honeycomb body segments 9, specifically one which does not form an axial end section of the honeycomb body but rather which is disposed centrally, has two normal faces 10. The honeycomb body segment 9 is additionally distinguished by deflecting structures 23. In particular, with such a configuration, it may be provided that, in (indirect) succession in the flow direction of the exhaust gas, a honeycomb body segment with an oblique front surface is formed with a hydrolysis coating, a central honeycomb body segment with two normal faces forms an SCR catalytic converter, and the honeycomb body segment which forms an outflow surface is an oxidation catalytic converter. The central honeycomb body segment with two normal faces may, in particular, also be a three-way catalytic converter and/or may, if appropriate, have different coatings in different regions. It is preferable for the honeycomb body segments to be directly connected to one another, for example by virtue of the housing parts of the honeycomb body segments being welded to one another.

It is also illustrated in FIG. 3 that the channels 2 of the individual honeycomb body segments 9 may also be disposed with an offset 24 with respect to one another, in such a way that a turbulence and thorough-mixing zone is formed at the transition from one honeycomb body segment into a subsequent honeycomb body segment.

Figure 4:
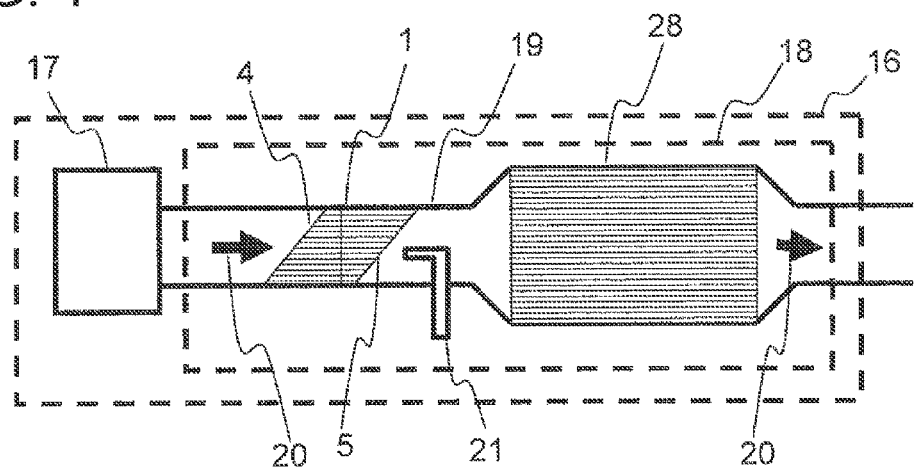
FIG. 4 is a plan view of a motor vehicle having an exhaust system which has a honeycomb body according to the invention.

FIG. 4 shows a motor vehicle 16 according to the invention having an internal combustion engine 17 and having an exhaust system 18 which has a honeycomb body 1 according to the invention in an exhaust line 19. The exhaust gas produced in the internal combustion engine 17 flows along the exhaust line 19 away from the internal combustion engine 17 in a flow direction 20. As it travels along the flow direction 20, exhaust gas impinges firstly on a front surface 4 of a honeycomb body 1 according to the invention. The exhaust gas subsequently exits the honeycomb body 1 according to the invention through an end surface 5, which may be wetted with reducing agent by a supply 21 for reducing agent. The supply 21 has a deflection which constitutes a flow resistance for exhaust gas. The exhaust gas subsequently passes through a catalytic converter 28, which may typically be an SCR catalytic converter.

Figure 5:
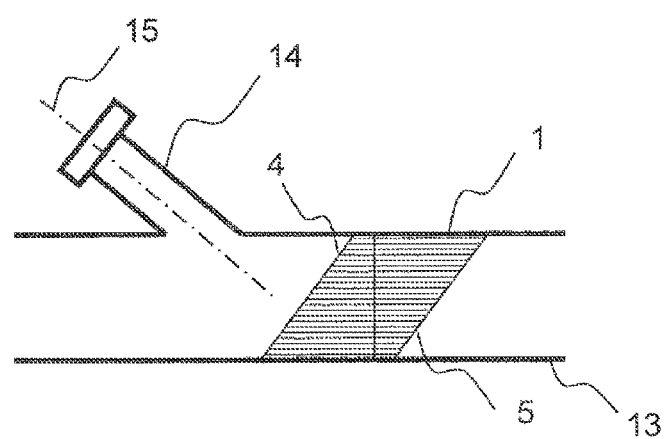
FIG. 5 is a longitudinal-sectional view of an exhaust line section according to the invention.

FIG. 5 illustrates an exhaust line section 13 having a honeycomb body 1. The exhaust line section 13 has a branch 14 with a direction of extent 15 disposed normally (perpendicular) to the front surface 4 of the honeycomb body 1 according to the invention. A supply 21 for reducing agent is disposed in the branch 14 and can apply the reducing agent frontally onto the front surface 4 without constituting a flow resistance in the exhaust line 19, because a deflection of the supply 21 is not required in this case. It is self-evident that a reversed configuration from a flow aspect, in which reducing agent is thus supplied onto the end surface 5, is also possible.

Figure 6:
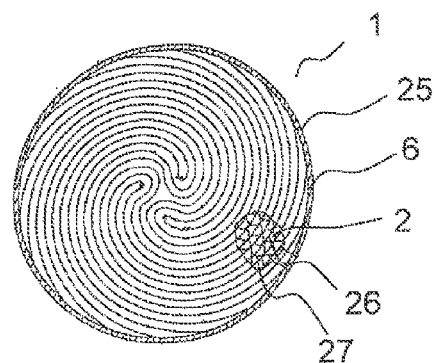
FIG. 6 is a cross-sectional view of a honeycomb body according to the invention.

FIG. 6 illustrates a cross section through a honeycomb body 1. It can be seen in this case, in particular, that the honeycomb body 1 is composed of a plurality of stacks of smooth sheet-metal layers 26 and corrugated sheet-metal layers 27 which form the channels 2. The stacks are twisted relative to one another in a housing 25.

The invention accordingly relates to a honeycomb body for an exhaust-gas purification system. Honeycomb bodies of this type may be used, for example, as carrier bodies for catalytically acting coatings or as filters, adsorbers or mixers in the exhaust system of an internal combustion engine. The honeycomb body according to the invention is a honeycomb body having channels, having an axial main direction, having a planar front surface, having a planar end surface and having a circumferential surface which is disposed parallel to the axial main direction, wherein at least the front surface and/or the end surface are disposed obliquely with respect to the axial main direction. Honeycomb bodies of this type are advantageous, in particular, for applying reducing agent to the oblique end or front surface.

The invention claimed is:

1. A honeycomb body, comprising:
   walls defining channels extending along an axial main direction and a circumferential surface disposed parallel to said axial main direction;
   a planar front surface defined by first ends of said walls;
   a planar end surface defined by second ends of said walls; and
   at least one of said front surface or said end surface being disposed obliquely relative to said axial main direction.

2. The honeycomb body according to claim 1, which further comprises at least one at least partially corrugated metal layer forming said walls.

3. The honeycomb body according to claim 2, which further comprises at least two honeycomb body segments each having at least one planar face oriented normal to said axial main direction, said normal faces of said at least two honeycomb body segments facing one another.

4. The honeycomb body according to claim 3, wherein said at least two honeycomb body segments each have said channels and walls, and said channels of said at least two honeycomb body segments are disposed flush with one another along said axial main direction.

5. The honeycomb body according to claim 1, which further comprises a longest axial extent and a shortest axial extent parallel to said axial main direction, said longest axial extent being significantly longer than said shortest axial extent.

6. The honeycomb body according to claim 1, wherein said planar front surface and said planar end surface are substantially mutually parallel.

7. An exhaust line section, comprising:
   a honeycomb body according to claim 1, said front surface and said end surface of said honeycomb body being oblique; and
   at least one exhaust line section branch having a direction of extent, said at least one exhaust line section branch facing one of said oblique front surface or oblique end surface and being directed toward said one oblique front surface or oblique end surface.

8. A motor vehicle, comprising:
   an internal combustion engine; and
   an exhaust system having an exhaust line with a main flow direction and at least one honeycomb body according to one of claim 1;
   said exhaust system having a supply for reducing agent, said supply disposed downstream of said honeycomb body in said main flow direction, causing reducing agent supplied by said supply to impinge in a backward direction against said oblique front surface or said oblique end surface of said honeycomb body.

9. A motor vehicle, comprising:
   an internal combustion engine;
   an exhaust system having an exhaust line with a main flow direction and at least one exhaust line section;
   said at least one exhaust line section including a honeycomb body according to claim 1, said front surface and said end surface of said honeycomb body being oblique;
   said at least one exhaust line section including at least one exhaust line section branch having a direction of extent;
   said at least one exhaust line section branch facing one of said oblique front surface or said oblique end surface and being directed toward said one oblique front surface or oblique end surface; and
   said exhaust system having a supply for reducing agent, said supply disposed downstream of said honeycomb body in said main flow direction, causing reducing agent supplied by said supply to impinge in a backward direction against said oblique front surface or said oblique end surface of said honeycomb body.

10. A method for producing a honeycomb body, the method comprising the following steps:
   a) providing an initial honeycomb body having an axial main direction and two faces normal to the axial main direction;
   b) dividing the initial honeycomb body along an oblique line to form two honeycomb body segments;
   c) configuring the two faces to face one another; and
   d) connecting the two honeycomb body segments to one another.

11. A motor vehicle, comprising:
   an internal combustion engine; and
   an exhaust system having an exhaust line with a main flow direction and at least one honeycomb body having the characteristics of a honeycomb body produced by the method according to claim 10, said at least one honeycomb body having an oblique front surface and an oblique end surface;

said exhaust system having a supply for reducing agent, said supply disposed downstream of said honeycomb body in said main flow direction, causing reducing agent supplied by said supply to impinge in a backward direction against said oblique front surface or said oblique end surface of said honeycomb body.

12. The method according to claim 10, wherein the oblique line is oblique relative to the axial main direction.

* * * * *